United States Patent [19]
Fink et al.

[11] 3,927,914
[45] Dec. 23, 1975

[54] HYDRAULIC ANTI-SKID CONTROL ARRANGEMENT INCLUDING A PLURALITY OF THROTTLES FOR SYNCHRONOUS AND ASYNCHRONOUS CONTROL OF THE WHEELS OF ONE AXLE OF A VEHICLE

[75] Inventors: Werner Fink; Dieter Kircher, both of Frankfurt am Main, Germany

[73] Assignee: ITT Industries, Inc., New York, N.Y.

[22] Filed: Oct. 17, 1973

[21] Appl. No.: 407,123

Related U.S. Application Data
[62] Division of Ser. No. 290,293, Sept. 22, 1972, Pat. No. 3,819,236.

[30] Foreign Application Priority Data
Nov. 4, 1971 Germany............................ 2154806

[52] U.S. Cl. ............................... 303/21 F; 303/68
[51] Int. Cl.² ........................................ B60T 8/02
[58] Field of Search....................... 303/21 F, 61–63, 303/68–69, 6 R; 188/181 A, 106 P

[56] References Cited
UNITED STATES PATENTS

| | | |
|---|---|---|
| 3,608,984 | 9/1971 | Skoyles............................ 303/21 F |
| 3,639,009 | 2/1972 | Klein et al........................ 303/21 F |
| 3,704,044 | 11/1972 | Ingram et al..................... 303/21 F |
| 3,708,213 | 1/1973 | Skoyles........................... 188/181 A |
| 3,729,233 | 4/1973 | Mangold......................... 188/181 A |
| 3,767,271 | 10/1973 | Grosseau ............................. 303/68 |

*Primary Examiner*—Trygve M. Blix
*Assistant Examiner*—Douglas C. Butler
*Attorney, Agent, or Firm*—John T. O'Halloran; Menotti J. Lombardi, Jr.; Alfred C. Hill

[57] ABSTRACT

A hydraulic control arrangement for an antiskid control system includes, in addition to known arrangements responsive to a continuously measured control value to prevent wheel lock, differently cooperating throttles and an emergency throttle for the synchronous and asynchronous control of the wheels of one axle. The throttles and emergency throttle control the build up and decrease of brake pressure in the wheel brake cylinders of the wheels of a single axle in a manner to prevent a jerky control of the brake pressure and, thus, an uncomfortable ride.

3 Claims, 3 Drawing Figures

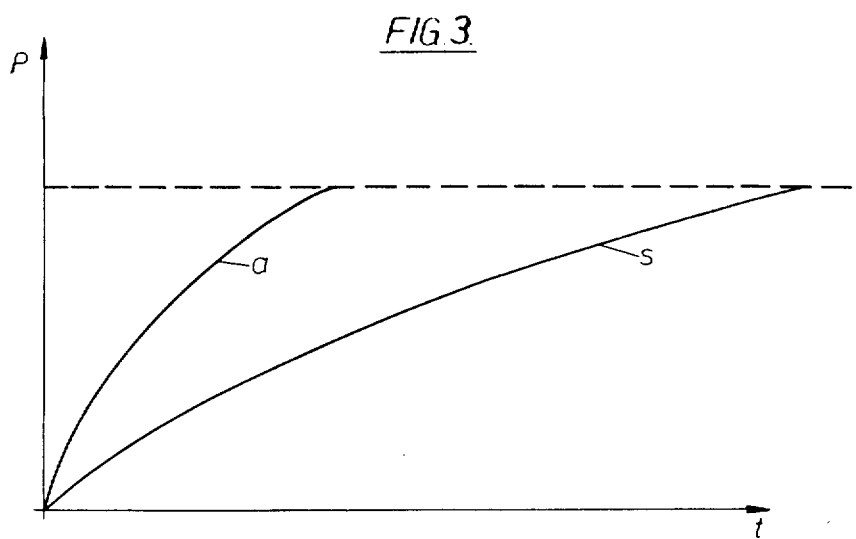

3,927,914

HYDRAULIC ANTI-SKID CONTROL ARRANGEMENT INCLUDING A PLURALITY OF THROTTLES FOR SYNCHRONOUS AND ASYNCHRONOUS CONTROL OF THE WHEELS OF ONE AXLE OF A VEHICLE

CROSS-REFERENCE TO RELATED APPLICATIONS

This is a division of application Ser. No. 290,293 filed Sept. 22, 1972, now U.S. Pat. No. 3,819,236, issued June 25, 1974.

BACKGROUND OF THE INVENTION

The invention relates to a device for antiskid control, in particular for motor vehicles, by means of which upon an initiated braking operation the pressure in the wheel brake cylinders is cyclically reduced and reincreased dependent upon a continually measured control value produced in an electronic control signal generator coupled to the vehicle wheels by speed or deceleration detectors.

A variety of embodiments of devices of the type referred to above has been suggested.

If during a braking operation a pressure is built up in the wheel brake cylinders which is excessive with regard to the prevailing friction conditions between the road surface and the wheel contact surface, the difference between the translational speed of the vehicle and the rotational speed of the wheel, or rather the slip of the wheel, increases and surpasses a value from whereon the friction between the road surface and the wheel will become less and less. As a consequence the wheels lock and, hence, the stopping distance is lengthened and there if a loss in the lateral control of the vehicle. In order to prevent this dangerous situation, the pressure in the wheel brake cylinder is reduced dependent upon a control value or signal produced in an electronic control generator indicating the state of motion prevailing at the wheel and the pressure is re-increased when the danger of locking has passed. This operation will be repeated during a braking as often as the wheel approaches the critical state of motion. This will cause inconvenient jerky movements of the vehicle - especially if the control is synchronous for the wheels of one axle, i.e. if the wheels of one axle will simultaneously reach the critical range. These jerky movements will both impair the driving behavior and lead to resonant vibrations and to high mechanical stresses on certain parts of the vehicle. The more abrupt these pressure changes are the more these undesired side effects will be noticed.

Devices are known by means of which the re-increase of the pressure in the wheel brake cylinders is effected in a throttled manner. Up to now, however, it was not realized that the conditions during synchronous and asynchronous control of the wheels of one axle are different and that consequently both control operations must be differently considered.

Summary of the Invention

It is the object of the present invention to provide an arrangement for antiskid control with means which enhance the good driving behavior and improve the control characteristic of the antiskid control system.

According to the present invention this object is solved in that for the purpose of synchronous and asynchronous control of the wheels of one axle differently cooperating throttles and an emergency throttle are provided for the building-up of pressure in the wheel brake cylinders of the wheels of this axle.

A feature of the present invention is the provision of a hydraulic control arrangement for an antiskid control system conprising: a pair of wheel brake cylinders, each of the brake cylinders being associated with a different one of a pair of wheels of a single axle of a motor vehicle; an actuation unit; a reservoir; a pair of first arrangements, each of the first arrangements being connected to the reservoir and between a different one of the brake cylinders and the actuation unit to control brake pressure in an associated one of the brake cylinders in response to a control signal indicating the state of motion of an associated one of the pair of wheels; and a second arrangement including a plurality of throttles and an emergency throttle, the plurality of throttles and the emergency throttle being connected to each of the pair of first arrangements to smooth build up and decrease of brake pressure in the pair of brake cylinders during asynchronous and synchronous control of the brake pressure in the pair of brake cylinders by each of the pair of first arrangements.

According to another feature of the present invention an input valve is disposed in both the branches of the pressure medium lines leading to the wheel brake cylinders of one axle and an output valve is disposed in the return lines which branch off between the input valves and the wheel brake cylinders. The input valves are each followed by a throttle while an emergency throttle is connected in the common pressure medium line between the actuation unit (the master cylinder) and the bifurcation point to which the branches of the pressure medium lines leading to the wheel brake cylinders are connected.

Still another feature of the present invention is that the emergency/ throttle disposed in the common pressure medium line has a passage cross-section that exceeds the passage cross-sections of the throttles disposed in the branches of the pressure medium line leading to the wheel brake cylinders of the single axle, with the latter two throttles having the same size passage cross-section. The emergency throttle, for instance, has a passage diameter of 0.28 mm (millimeters) while the two throttles in the branches of the pressure medium line each have a passage diameter of 0.2 mm.

A special feature of the present invention is that the input valves in the branches of the pressure medium line leading to the wheel brake cylinders of one axle may act as throttles when they are in their open positions.

A further feature of the present invention is the provision that the return lines, each branching off between the input valves and the wheel brake cylinder, include an output valve and a throttle connected in series.

Still another further feature of the present invention is the provision of a hydraulically controllable plunger unit provided with a separating valve for volume expansion disposed in each of the pressure medium line leading to the wheel brake cylinders of one axle and an output valve and a throttle connected in series in each of the return lines proceeding from the control chambers of the plunger units. These return lines unite to form a common return line in which an emergency throttle is connected. In this arrangement the passage cross-section of the emergency throttle also exceeds the passage cross-section of the throttles which are connected in the return lines leading from the control chambers of the plunger units to said common return line with these latter two throttles having the same size passage cross-section.

The emergency throttle exemplarily has a passage diameter of 0.28 mm while the two other throttles have a passage diameter each of 0.2 mm. Also the output valves in the return lines proceeding from the control chambers of the plunger units may act as throttles when they are in their open positions.

In accordance with another feature of the present invention the control lines of the plunger units connected to the actuating unit each have an input valve and a throttle connected in series.

Brief Description of the Drawing

Above-mentioned and other features and objects of this invention will become more apparent by reference to the following description taken in conjunction with the accompanying drawing, in which:

FIG. 3 shows a diagram illustrating the curves of the pressure reduction for both synchronous and asynchronous control of the wheels of one axle.

Description of the Preferred Embodiments

In order to understand the basic principles of the present invention, it is necessary to realize that an asynchronous control of the two wheels of one axle is of advantage and desirable with respect to overcoming the above-mentioned difficulties. If the wheels of one axle are controlled in an asynchronous manner each time, only an amount of pressure medium will be displaced which corresponds to the absorbing capacity inherent in the wheel brake cylinders of one wheel brake. Consequently, the forces ensuing are smaller than those ensuing from a synchronous control of the wheels where the amount of pressure medium displaced corresponds to the absorbing capacity of the wheel brake cylinders of the two wheel brakes. Indeed, in practice, the frictional conditions for the wheels of one axle will often be different so that the wheels will not enter the critical range of the control value at the same time and the pressure medium variations and the force transmission will not surpass the permissible limit under the provisions which usually are made anyway.

The present invention provides additional devices which will dampen the force transmission absolutely only in case both wheels on one axle reach the critical state of motion and a synchronous control results.

Figure 1:
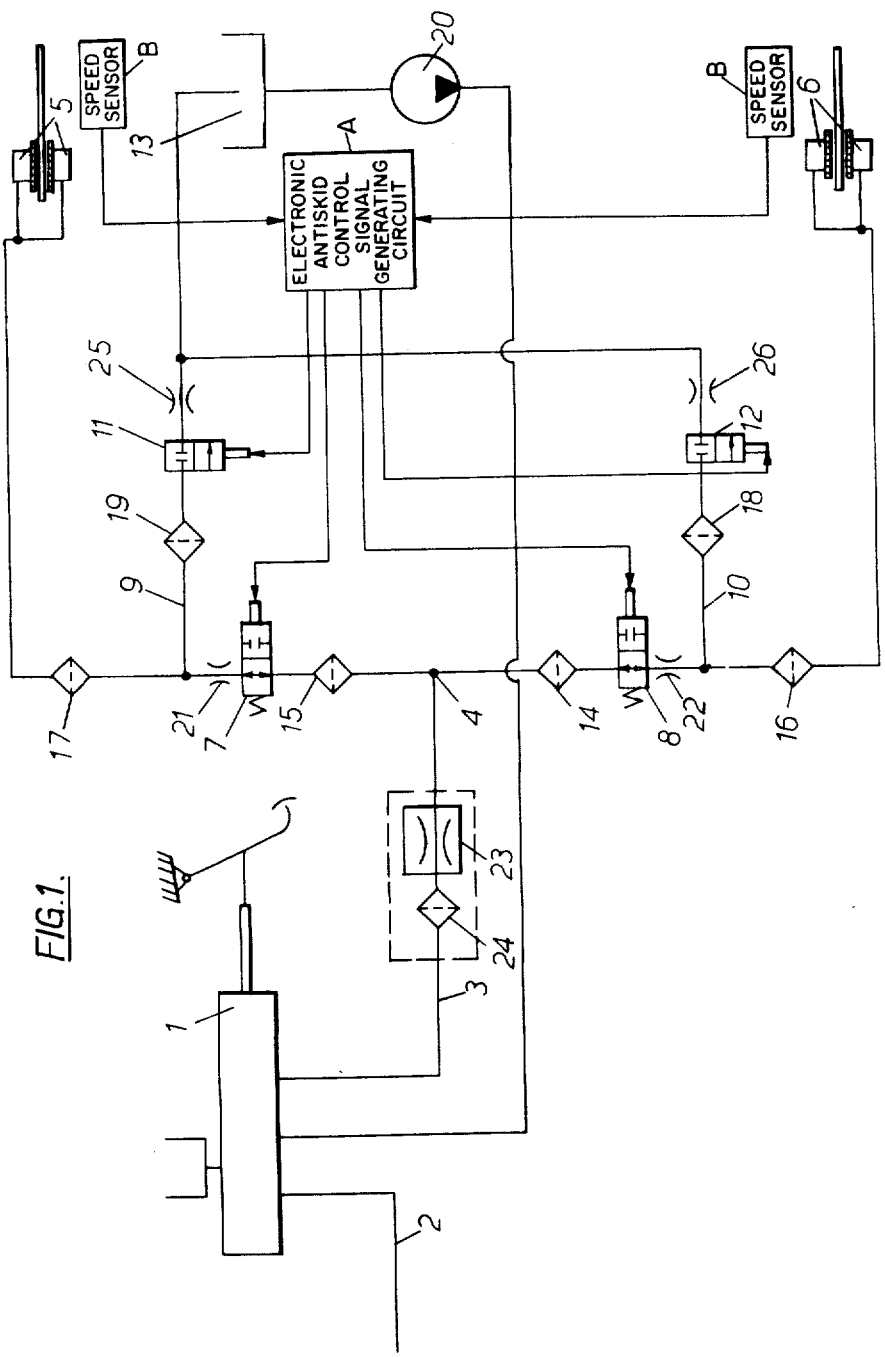
FIG. 1 shows the arrangement of the present invention incorporated in an antiskid control system where the pressure in the wheel brake cylinders is controlled by means of pressure removal and new pressure supply.

FIG. 1 shows an inventive system for the wheels of but one axle where, in order to prevent locking of the wheels, the pressure in the wheel brake cylinders is controlled by pressure medium removal and new pressure medium supply effected by input and output valves which are controllable in accordance with a control value or signal for each wheel of a single axle indicating the state of motion of the associated wheel as produced by a known electronic control signal generating circuit (not shown) having as its input an output from a speed or deceleration detector associated with each wheel of the single axle.

The pressure medium lines 2 and 3 of the front-axle circuit and of the rear-axle circuit proceed from the actuation unit (master cylinder) 1 of the brake system. As already mentioned, the illustration shows the inventive arrangement for one axle only. The pressure medium line 3 branches off at bifurcation point 4 and leads to the wheel brake cylinders 5 and 6 of the two wheels of the rear-axle. In the pressure-medium-line sections between bifurcation point 4 and wheel brake cylinders 5 and 6 is connected an input valve 7 and 8, respectively. Input valves 7 and 8 are opened in their rest positions. Return lines 9 and 10 in which output valves 11 and 12 are connected, respectively, which in their rest positions are closed, lead from the respective line sections between input valves 7 and 8 and wheel brake cylinders 5 and 6 to the storage tank or reservoir 13 from where a return pump 20 will deliver the pressure medium to brake actuation unit 1. Before the input valves 7 and 8, fluid filters 14 and 15 are connected in the pressure medium line and further fluid filters 16 and 17 are connected beyond the bifurcation of return lines 9 and 10. In the return lines 9 and 10, before the respective output valves 11 and 12, there is also provided fluid filter 18 and 19.

According to the present invention, in order to overcome the difficulties mentioned above, the two input valves 7 and 8 are each followed by a suitably dimensioned throttle 21 and 22, respectively, for damping the building-up of pressure in wheel brake cylinders 5 and 6 of the two wheels from the actuation unit 1. Throttles 21 and 22 are adapted to the absorbing capacity of each of the associated wheel brake cylinders and prevent too abrupt an application of the brake linings. In addition, in pressure medium line 3, between actuation unit 1 and bifurcation point 4, an emergency throttle 23 is advantageously connected in series with a fluid filter 24. Emergency throttle 23 has a larger passage cross-section than the two throttles 21 and 22 connected in the branch lines leading to wheel brake cylinders 5 and 6. For example, throttles 21 and 22 each have a passage diameter of 0.2 mm may be connected in the branch lines while in common pressure medium line 3 an emergency throttle may be connected which is provided with a passage diameter of 0.28 mm. The undesired jerky movements and vibrations are essentially caused and influenced by the total amount of pressure medium displaced per time unit. According to needs, this total amount of pressure medium displaced per time unit will now be limited by emergency throttle 23.

If the pressure is synchronously built up in the wheel brake cylinders 5 and 6 of the two wheels of one axle, common emergency throttle 23 with the larger passage cross-section determines the pressure increase in wheel brake cylinders 5 and 6. Throttles 21 and 22 behind input valves 7 and 8 in the branches of common pressure medium line 3 leading to wheel brake cylinders 5 and 6 will not become effective at all since the emergency throttle in the common pressure medium line 3 has the effect that only a reduced total amount of pressure medium may be displaced per time unit beyond bifurcation point 4, this reduced total amount of pressure medium being circulated in equal parts to wheel brake cylinders 5 and 6 of the two wheels without any influence by throttles 21 and 22.

Thus, in the event of synchronous build up of pressure in wheel brake cylinders 5 and 6 of one axle emergency throttle 23 provides a smooth course of pressure increase (see Curve s, FIG. 3) and, hence, a soft application of the brake linings. The total amount of pressure medium displaced per time unit will be kept constant by means of emergency throttle 23 which is no detriment to comfortable driving. When one of the wheels approaches the critical range of the control value, the respective input valve 7 or 8 and the respective output valve 11 or 12 will be actuated and the pressure medium will expand from the brake line section hydraulically separated from the remaining brake line by the closed input valve 7 or 8 through the return line 9 or 10, through the opened output valve 11 or 12 and possibly through a throttle 25 or 26 to storage tank 13. Throttles 25 and 26 connected in the return lines have a wide enough passage cross-section with respect to the absorbing capacity of the wheel brake cylinders 5 and 6 of the respective wheel in order to safeguard a fast pressure reduction in the event of wheel locking danger.

If, due to different frictional conditions between the road surface and the wheel contact surface of the wheels of one axle, the pressure has been reduced because of locking danger in one wheel brake cylinder 5 or 6 of one wheel only and if this wheel has regained a certain speed, after the return of the input and output valves into their rest positions, it will be only this wheel which for the purpose of terminating the control cycle will have to be braked anew. Thus, the control will be asynchronous. Since emergency throttle 23 with the large passage cross-section will not hinder the passage the amount of pressure medium corresponding to the absorbing capacity of the wheel brake cylinders of one caliper, the course of pressure increase will now be determined by throttle 21 or 22 connected behind input valve 7 or 8 while emergency throttle 23 will have no effect.

Since during asynchronous build up of pressure it is only the amount of pressure medium corresponding to the absorbing capacity of the wheel brake cylinders of one caliper that is to be displaced, a faster pressure increase in these wheel brake cylinders is possible (see Curve a, FIG. 3). This pressure increase is determined by throttle 21 or 22 connected in series with the respective input valve 7 or 8 only.

Figure 2:
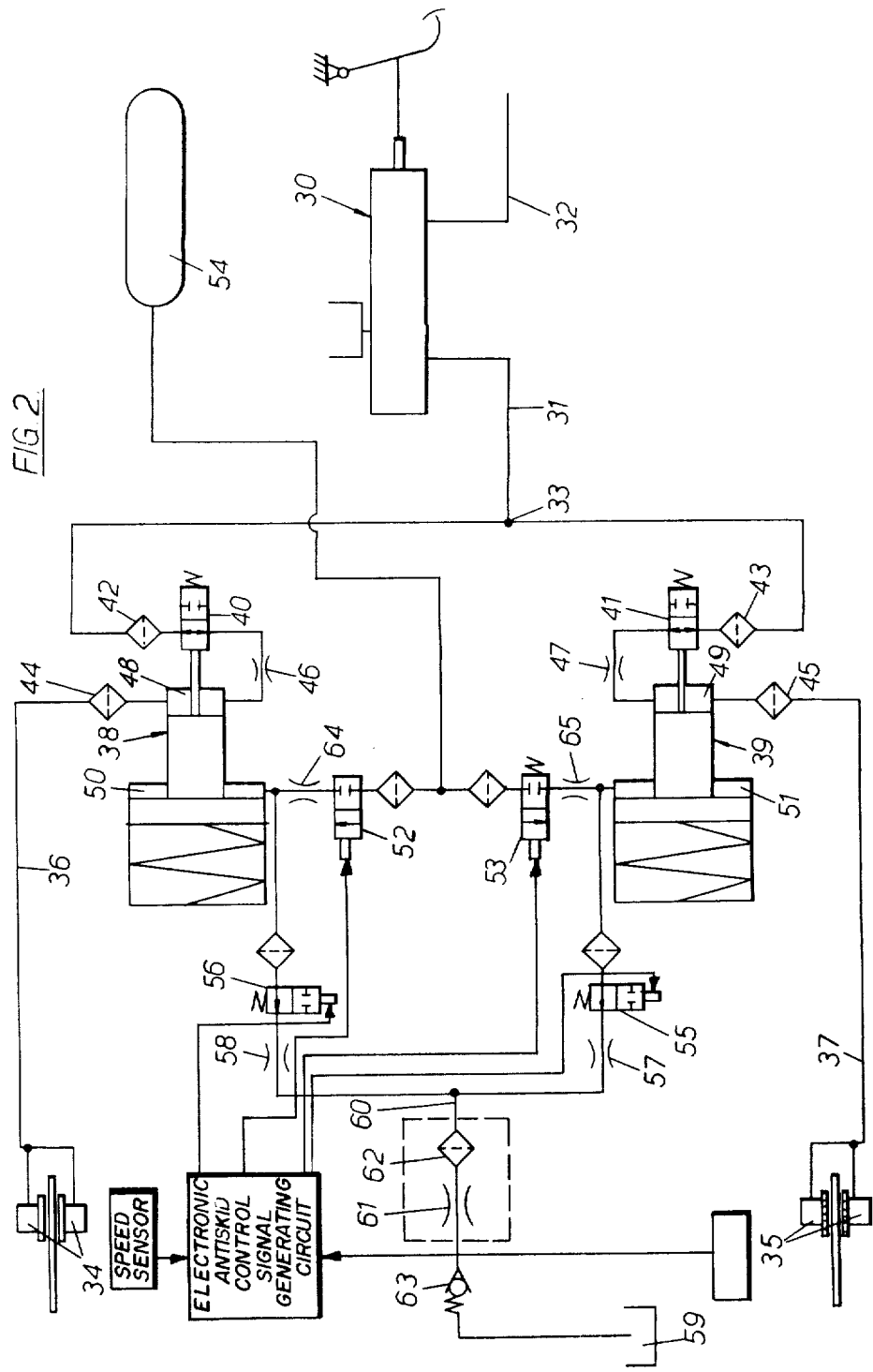
FIG. 2 shows the arrangement of the present invention incorporated in an antiskid control system where the pressure in the wheel brake cylinders is controlled by means of volume expansion.

FIG. 2 shows another embodiment of the present invention in connection with an antiskid control system where the pressure in the wheel brake cylinders is controlled by a change in volume in the brake line section connected with the wheel brake cylinders.

The pressure medium lines 31 and 32 lead from the actuation unit 30 to the front and rear axles. The drawing illustrates the further arrangement of the present invention for one axle only. At bifurcation point 33 pressure medium line 31 branches off to the wheel brake cylinders 34 and 35 of the wheels of this axle. In each of the two pressure medium line branches 36 and 37 of the pressure medium line 31 there is connected a spring-loaded plunger unit 38, 39 and a mechanically or hydraulically operable separating valve 40, 41. Separating valves 40 and 41 are open in their rest positions. Before separating valves 40 and 41 and behind plunger units 38 and 39 in branches 36 and 37, there are provided fluid filters 42, 43, 44 and 45. Suitably dimensioned throttles 46 and 47 are also advantageously provided for the normal build up of pressure. The front surfaces of the plungers of units 38 and 39 are designed as stepped pistons defining chambers 48 and 49 which are permanently connected with wheel brake cylinders 34 and 35 by means of the respective branches 36 and 37 of the pressure medium line. As illustrated the plungers are hydraulically controlled and displaceable against the force of a spring by which they are stressed. In addition chambers 50 and 51 containing the annular surfaces serving as application surfaces are connected with an accumulator 54 via input valves 52 and 53 closed in the rest position. Two output valves 55 and 56, open in their rest positions, connect annular chambers 50 and 51 via throttles 57 and 58 with storage tank 59. After having passed output valves 55 and 56 and throttles 57 and 58, the two return lines coming from annular chambers 50 and 51 of the two plunger units unite to form a common return line 60. In return line 60 an emergency throttle 61 is connected in series with a fluid filter 62. In addition, in return line 60, a non-return valve 63 is connected which opens towards storage tank 59.

During a normal build up of pressure in the wheel brake cylinders 34 and 35 from actuation unit 30 at the beginning of a braking operation, the pressure supplied circulates through separating valves 40 and 41, which in the rest position are open, and through chambers 48 and 49 situated before the front surfaces of the plungers and through throttles 46 and 47 to the wheel brake cylinders 34, 35. If only one of the two wheels comes into the critical state of motion, i.e., if asynchronous control will be necessary, actuation signals of the input valve and of the output valve for the control of the plunger of the respective wheel will be emitted. Thus, for example, output valve 56 will close and input valve 52 will open. The annular surface in chamber 50 of plunger unit 38 will be applied with accumulator pressure and will be displaced against the force of a spring. In doing so, separating valve 40 will close and chamber 48 connected with wheel brake cylinder 34 will enlarge so that the pressure medium in branch line 36 may expand. Throttle 64 provided between control chamber 50 end input valve 52 is sufficiently dimensioned to enable a fast pressure reduction. After the wheel has regained its speed, input valve 52 and output valve 56 will be returned into the rest position. For the purpose of a new build up of pressure, the force of the spring will cause the plunger of plunger unit 38 to return to its initial position and separating valve 40 will open. During this movement of the plunger of unit 38 displaces the pressure medium from control chamber 50, the pressure medium escaping through output valve 56, throttle 58, emergency throttle 61 and through non-return valve 63 into storage tank 59. Since during asynchronous control only the amount of pressure medium contained in the control chamber of a plunger unit is to be discharged, its discharging speed is throttled by a throttle 58 or 57 which has a smaller passage cross-section than the emergency throttle 61. Thus, emergency throttle 61 remaining without effect and allow an unhindered passage of the pressure medium discharged from the plunger unit which is throttled only by one of the throttles 58 or 57. A build up of pressure in the wheel brake cylinders according to Curve a, FIG. 3 is the result. Thus, during asynchronous control one of the throttles 58 or 57 will determine the amount of pressure medium displaced per time unit.

In the event of synchronous control of the wheels of one axle, input valves 52 and 53 and output valves 55 and 56 of two plunger units 38 and 39 will be simultaneously actuated and both plungers will be simultaneously displaced by the pressure from accumulator 54 against the force of the springs. The pressure medium being displaced from chambers 50 and 51 and throttled by throttles 57 and 58 will unite in the common return line 60 and will be throttled again by emergency throttle 61 before flowing through non-return valve 63 into storage tank 59. In this way, the plungers will return into the initial positions in a retarded manner and a gradual build up of pressure in wheel brake cylinders 34 and 35 and, hence, a dampened application of pressure to the brakes will be achieved (see Curve s, FIG. 3).

Thus, jerky movements and resonant vibrations in the vehicle will be widely eliminated and the driving behavior is improved.

While we have described above the principles of our invention in connection with specific apparatus it is to be clearly understood that this description is made only by way of example and not as a limitation to the scope of our invention as set forth in the objects thereof and in the accompanying claims.

We claim:

1. A hydraulic control arrangement for an antiskid control system comprising:
   a pair of wheel brake cylinders, each of said brake cylinders being associated with a different one of a pair of wheels of a single axle of a motor vehicle;
   a master cylinder;
   a reservoir;
   a pressure medium accumulator;
   a first hydraulically controlled plunger unit including a first chamber, a second chamber and a first plunger sealably separating said first and second chamber and movable in said first and second chambers;
   a first normally open separating valve mechanically connected to said first plunger and hydraulically connected to said master cylinder;
   a first throttle hydraulically connected in series with said first separating valve and said first chamber, said first chamber being hydraulically connected to one of said pair of brake cylinders;
   a second hydraulically controlled plunger unit including a third chamber, a fourth chamber and a second plunger sealably separating said third and fourth chambers and movable in said third and fourth chambers;
   a second normally open separating valve mechanically connected to said second plunger and hydraulically connected to said master cylinder;
   a second throttle hydraulically connected in series with said second separating valve and said third chamber, said third chamber being hydraulically connected to the other of said pair of brake cylinders;
   a first normally closed input valve hydraulically connected to said accumulator responsive to a first control signal indicating the state of motion of an associated one of said pair of wheels;
   a third throttle hydraulically connected in series with said first input valve and said second chamber;
   a first normally open output valve hydraulically connected to said second chamber responsive to said first control signal;
   a fourth throttle hydraulically connected in series with said first output valve;
   a second normally closed input valve hydraulically connected to said accumulator responsive to a second control signal indicating the state of motion of an associated one of said pair of wheels;
   a fifth throttle hydraulically connected in series with said second input valve and said fourth chamber;
   a second normally open output valve hydraulically connected to said fourth chamber responsive to said second control signal;
   a sixth throttle hydraulically connected in series with said second output valve;
   an emergency throttle hydraulically connected in common to said fourth and sixth throttles; and
   a non-return valve hydraulically connected in series with said emergency throttle and said reservoir;
   said first input valve and said first output valve responding to an incipient skid condition of said first control signal to actuate said first plunger by pressure medium from said accumulator operating in said second chamber, said first plunger in turn actuating said first separating valve to block pressure medium flow from said master cylinder to said one of said pair of brake cylinders and cause a volume expansion for said one of said brake cylinders in said first chamber; and
   said second input valve and said second output valve responding to an incipient skid condition of said second control signal to actuate said second plunger by pressure medium from said accumulator operating in said fourth chamber, said second plunger in turn actuating said second separating valve to block pressure medium from said master cylinder to said other of said pair of brake cylinders and cause a volume expansion for said other of said brake cylinders in said third chamber.

2. A hydraulic control arrangement according to claim 1, wherein
   each of said fourth and sixth throttles include a passage having a first given diameter; and
   said emergency throttle includes a passage having a second given diameter greater than said first given diameter.

3. A hydraulic control arrangement according to claim 2, wherein
   said first given diameter is equal to 0.2 millimeters, and
   said second given diameter is equal to 0.28 millimeters.

* * * * *